United States Patent
Pescaru

(10) Patent No.: US 10,937,185 B2
(45) Date of Patent: Mar. 2, 2021

(54) SYSTEM AND METHOD TO DETECT ARTICULATE BODY POSE

(71) Applicant: Everseen Limited, Blackpool (IE)

(72) Inventor: Dan Pescaru, Timis (RO)

(73) Assignee: Everseen Limited, Blackpool (IE)

( * ) Notice: Subject to any disclaimer, the term of this patent is extended or adjusted under 35 U.S.C. 154(b) by 113 days.

(21) Appl. No.: 16/207,296

(22) Filed: Dec. 3, 2018

(65) Prior Publication Data
US 2020/0175713 A1 Jun. 4, 2020

(51) Int. Cl.
G06T 7/70 (2017.01)
G06K 9/00 (2006.01)
G06K 9/62 (2006.01)

(52) U.S. Cl.
CPC ............ G06T 7/70 (2017.01); G06K 9/00362 (2013.01); G06K 9/6201 (2013.01); G06K 9/6232 (2013.01); *G06T 2207/10016* (2013.01); *G06T 2207/20044* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 2008/0192116 A1* | 8/2008 | Tamir | ..................... | G06T 7/292 348/157 |
| 2013/0230211 A1 | 9/2013 | Tanabiki et al. | | |
| 2020/0082635 A1* | 3/2020 | Zhu | ........................... | G06T 7/55 |
| 2020/0145623 A1* | 5/2020 | Sadanand | .......... | G06K 9/00771 |

OTHER PUBLICATIONS

Cao et al., Realtime Multi-Person 2D Post Estimation Using Part Affinity Fields, The Robotics Institute, Carnegie Mellon University, Nov. 24, 2016.
Payer et al., "Simultaneous Multi-Person Detection and Single-Person Pose Estimation With a Single Heatmap Regression Network," Graz University of Technology, Austria.
International Search Report and Written Opinion in co-pending International Application No. PCT/IB2019/058911 dated Nov. 27, 2019.

* cited by examiner

*Primary Examiner* — Suhail Khan
(74) *Attorney, Agent, or Firm* — Young Basile Hanlon & MacFarlane, P.C.

(57) ABSTRACT

A system for detecting an articulate body pose from an imagery content includes an imaging module for capturing the imagery content, and a processor that is operable to obtain a top-down view of the imagery content, and process the top-down view to detect the articulate body pose using a machine learning algorithm, wherein the articulate body pose includes a plurality of joints. The processing includes creating a part confidence map corresponding to each joint of the articulate body pose, generating a heatmap by projecting the part confidence map on the top-down view of the imagery content, creating a part affinity map corresponding to each body part, generating a vector map by projecting the part affinity map on the top-down view of the imagery content, and generating a body-framework corresponding to the articulate body pose, using the heatmap and the vector map.

19 Claims, 6 Drawing Sheets

SYSTEM AND METHOD TO DETECT ARTICULATE BODY POSE

TECHNICAL FIELD

The present disclosure relates generally to detection of an articulate body pose; and more specifically, to systems to detect articulate body poses from imagery contents. Furthermore, the present disclosure also relates to methods for detecting articulate body poses from imagery contents.

BACKGROUND

With advancement in technology, pose estimation is gaining tremendous importance. Pose estimation contributes towards various applications such as analysis of human activities, analysis of activities of animals for research and so forth. Furthermore, pose estimation provides assistance in video surveillance by detecting unlawful activities by shop lifters such as theft and thereby alerting a personnel employed in the shop to prevent the theft. Moreover, pose estimation is employed in intelligent driver assisting systems, assisted living systems for humans in need, video games, physiotherapy, and so forth. Furthermore, pose estimation is actively used in the field of sports, military, medical, robotics and so forth.

Generally, pose detection is a challenging task as each human possess a different body structure, a different body shape, a different skin colour and so forth. Moreover, different types of clothing on the human beings add to complexity in estimation of the pose. Conventionally, a single person pose estimation method is used for pose estimation. The single person pose estimation method comprises a person detector, that detects each person in the image one by one, thereby making it a time-consuming process. Furthermore, the detection of multiple humans in the image is difficult as segmenting the humans from the background of the image is a gruelling task. Notably, as the number of people increases, the complexity of a real time estimation of the human pose increases, thereby making the real time performance of the pose estimation a big challenge.

Moreover, the pose estimation techniques presently used may lead to false positives, i.e. they may detect a non-human such as a human statue as a human. Typically, the pose estimation techniques used employ a horizontal line of sight camera setup that provides a limited view of the area for which the pose estimation is needed to be performed.

Therefore, in light of the foregoing discussion, there exists a need to overcome the aforementioned drawbacks associated with the pose detection techniques.

SUMMARY

According to a first aspect of the present disclosure, there is provided a system to detect articulate body pose from an imagery content. The system may include an imaging module for capturing the imagery content, and a processor communicatively coupled to the imaging module. The processor is operable to obtain a top-down view of the imagery content and process the top-down view to detect the articulate body pose corresponding to the imagery content using a machine learning algorithm. The processing may include creating a part confidence map corresponding to each joint of the articulate body pose, and generating a heatmap by projecting the part confidence map on the top-down view of the imagery content. The processing may further include creating a part affinity map corresponding to each body part associated with the each joint of the articulate body pose, and generating a vector map by projecting the part affinity map on the top-down view of the imagery content. The processing may further include generating a body-framework corresponding to the articulate body pose, using the heatmap and the vector map, to detect the articulate body pose.

According to a second aspect of the present disclosure, there is provided a method for detecting an articulate body pose from an imagery content. The method may include obtaining a top-down view of the imagery content and processing the top-down view to detect the articulate body pose corresponding to the imagery content using a machine learning algorithm. The processing may include creating a part confidence map corresponding to each joint of the articulate body pose, and generating a heatmap by projecting the part confidence map on the top-down view of the imagery content. The processing may further include creating a part affinity map corresponding to each body part associated with each joint of the articulate body pose, and generating a vector map by projecting the part affinity map on the top-down view of the imagery content. The processing may further include generating a body-framework corresponding to the articulate body pose, using the heatmap and the vector map, to detect the articulate body pose.

According to a third aspect of the present disclosure, there is provided a computer program product for detecting an articulate body pose from an imagery content. The computer programmable product comprises a set of instructions, such that when executed by a processor causes the processor to obtain a top-down view of the imagery content, and process the top-down view to detect the articulate body pose corresponding to the imagery content using a machine learning algorithm, wherein the articulate body pose includes a plurality of joints. The processing may include creating a part confidence map corresponding to each joint of the articulate body pose, and generating a heatmap by projecting the part confidence map on the top-down view of the imagery content. The processing may further include creating a part affinity map corresponding to each body part associated with each joint of the articulate body pose, and generating a vector map by projecting the part affinity map on the top-down view of the imagery content. The processing may further include generating a body-framework corresponding to the articulate body pose, using the heatmap and the vector map, to detect the articulate body pose.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides a system and a method to detect articulate body pose from an imagery content that utilizes a top-down view of the imagery content to detect the articulate body pose accurately with the help of an extended view delivered by the top-down view. Moreover, the system is able to detect the articulate body pose of multiple human bodies, animal bodies, or both, in the imagery content, taking into account the effect of a different body structure, a different body shape, a different skin color associated with each human and/or animal body in the imagery content. Furthermore, the system provides a time-efficient process as the detection of multiple articulate body poses occurs simultaneously. Moreover, the system enables reduction in a complexity faced by real time articulate body pose detection by accurately detecting each body, even when the number of bodies in real time increase.

Figure 1:
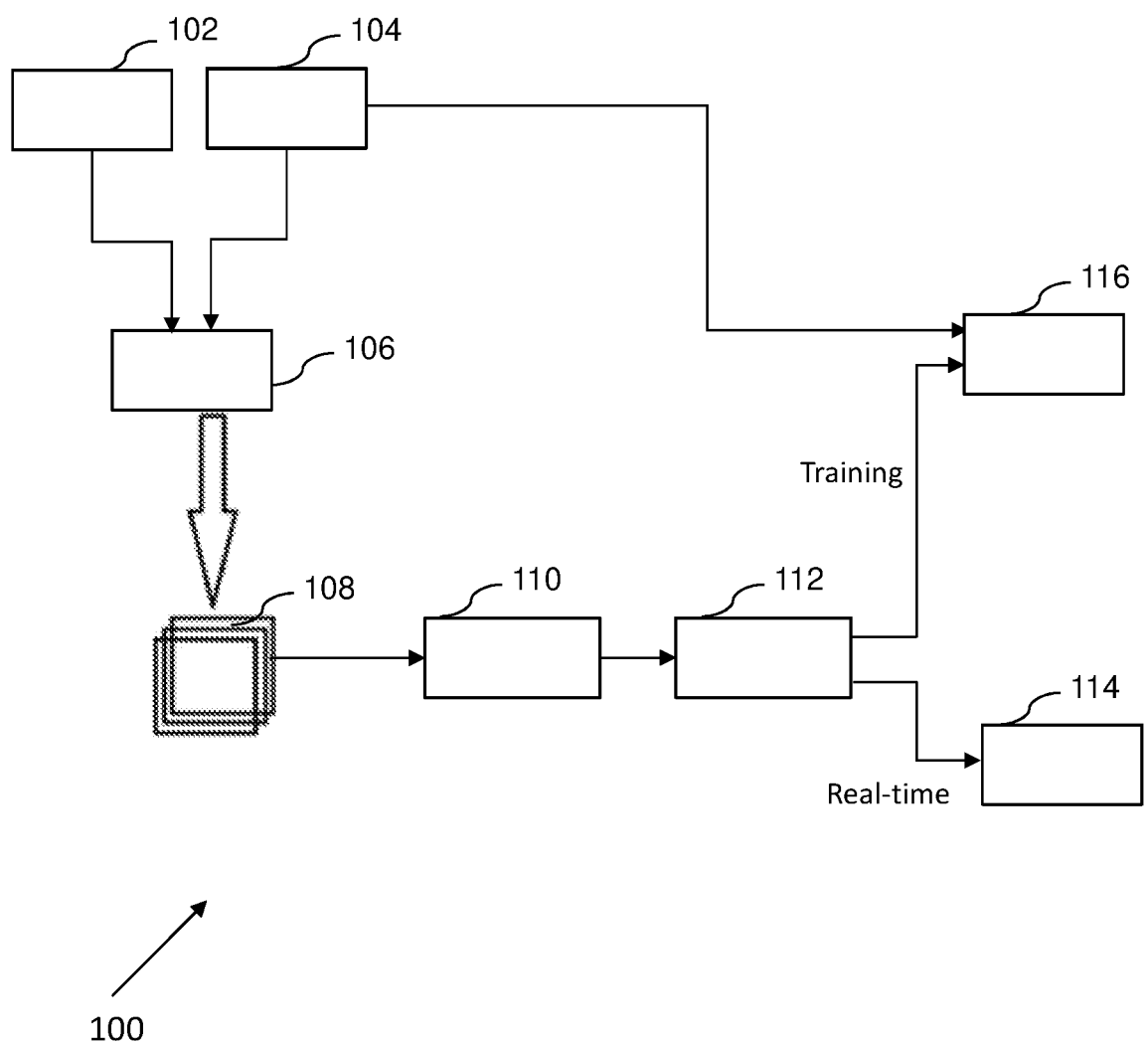
FIG. 1 is a block diagram of a system to detect an articulate body pose from an imagery content, in accordance with an embodiment of the present disclosure.

Referring to FIG. 1, there is shown a block diagram of a system 100 to detect an articulate body pose from an imagery content in accordance with the present disclosure. The system 100 comprises an imaging module 102 for capturing the imagery content. The imagery content comprises at least one of an image, a video and a graphics interchange format (GIF) based content. The imaging module 102 is configured to capture the imagery content in the form of one or more images, wherein the image includes at least one body whose pose may be detected. Moreover, the imagery content may be in the form of the video comprising a series of frames depicting the articulate body/bodies in various poses. Furthermore, the imagery content may comprise a GIF comprising a plurality of frames repetitive in nature, wherein the plurality of frames comprises at least one articulate body pose.

The imaging module 102 comprises an imaging device, a processor and a memory. Optionally, the imaging device includes, but is not limited to, a Closed-Circuit Television (CCTVs) camera, a High Definition (HD) camera, a non-HD camera, a handheld camera, a camera, a police car camera, and cameras employed on unmanned aerial vehicles (UAVs). Notably, one or more imaging devices may be used within the imaging module 102 for capturing and/or recording the imagery content. Optionally, the imaging module 102 is communicatively coupled to a remote device configured to capture and/or record the imagery content. The remote device includes, but is not limited to, a smartphone, a digital camera, a laptop computer, a personal computer and a tablet computer. Moreover, the imaging module 102 comprises the processor configured to process the imagery content received and/or captured by the imaging module 102. Throughout the present disclosure, the term 'processor' relates to a computational element that is operable to respond to and processes instructions that drive the system 100. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with the imaging module 102 that may be shared by other processing devices. The processed imagery content is further stored in the memory of the imaging module 102. The term "memory" as used herein relates to a volatile or persistent medium, such as an electrical circuit, magnetic disk, virtual memory or optical disk, in which a computer can store data or software for any duration. Optionally, the memory includes non-volatile mass storage such as physical storage media.

Figure 2:
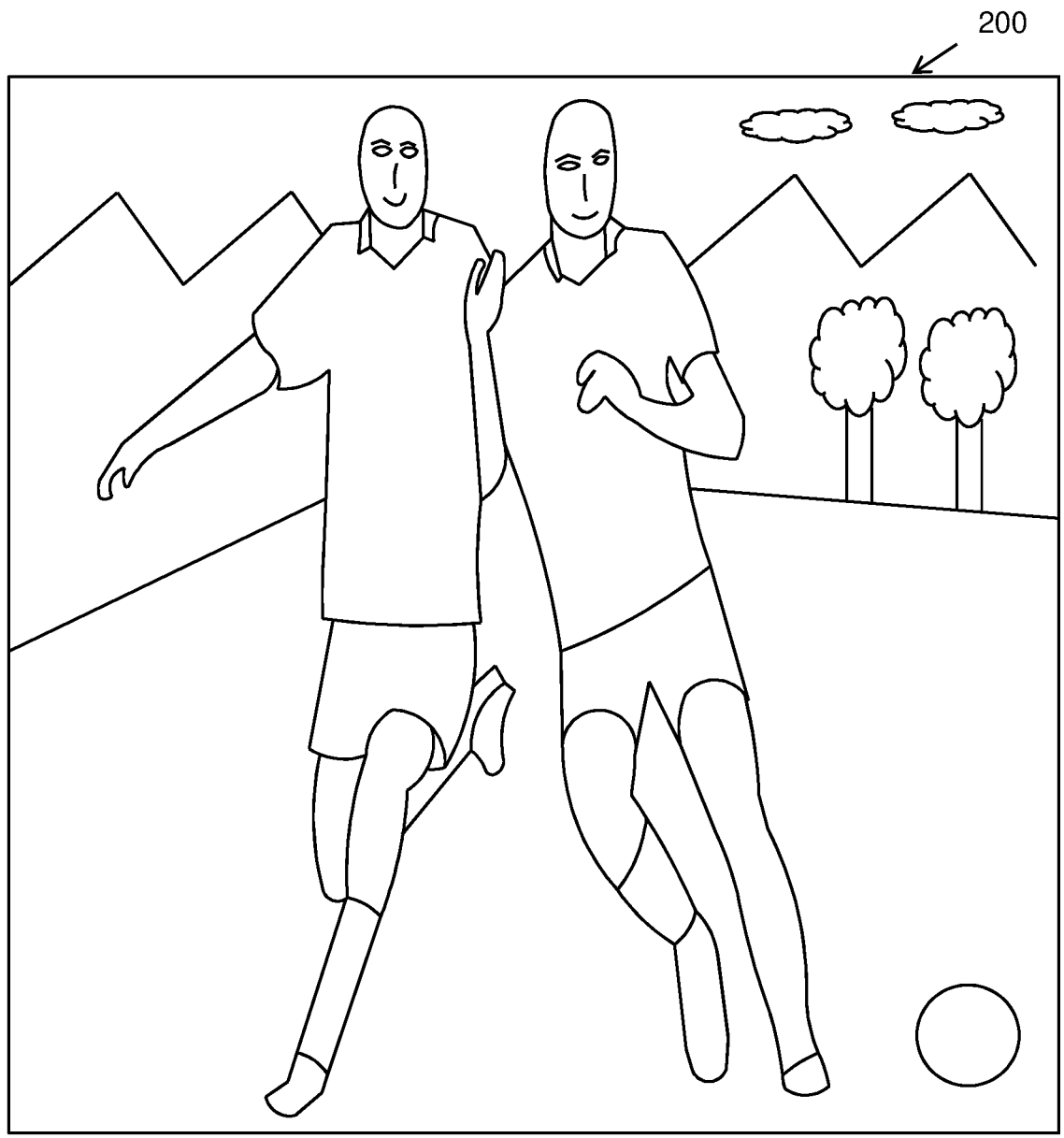
FIG. 2 is an illustration of an imagery content obtained by the system to detect an articulate body pose, in accordance with an exemplary embodiment of the present disclosure.

FIG. 2 illustrates an exemplary an imagery content 200 generated by the imaging module 102 by focusing on a vertical line of sight, while setting up the imaging module 102. The imagery content 200 may be obtained directly by an imaging device such as CCTVs, cameras employed at a height to capture a top-down view and so forth. In an example, the CCTVs are employed for surveillance in an area such as a hotel lobby. In another example, the cameras are employed at a height in a baseball field to capture the top-down view of each of the player in the baseball field. In an embodiment, the top-down view may be obtained by processing a plurality of views of an imagery content to obtain the top-down view therefrom. In an embodiment, the plurality of views of the imagery content comprises a rear view, a front view, a top view, a bottom view, a left-hand side view, a right-hand side view, and a perspective view.

Referring back to FIG. 1, the system 100 further comprises a ground truth generation module 104 that generates ground truth (GT) for the imagery content such as the imagery content 200. The GT generation module 104 relates to a structure and/or module that include programmable and/or non-programmable components configured to store, process and/or share information.

The first part of the GT label includes Part Confidence Maps (PCMs), where the PCMs define where joints are located in an articulate body pose of the imagery content 200, and how much of the area around the joint position would be considered "GT". In an example, the PCMs include annotations of where joint positions are actually located in the imagery content 200. For each type of joints (e.g. left shoulder, right elbow, head, etc.), the GT generation module 104 may generate a label matrix. In an example, the label matrix may be a (46×46) label matrix.

In an embodiment of the present disclosure, for generating the PCMs, the GT generation module 104 is configured to first determine (x, y) locations of each of the joint annotations, —, scale the determined locations to a value of a lower resolution and then apply a normal distribution, such as Gauss distribution around the determined location. The length of the distribution around the determined location, is considered as 'GT", and is indicated by a value, sigma.

Figure 3:
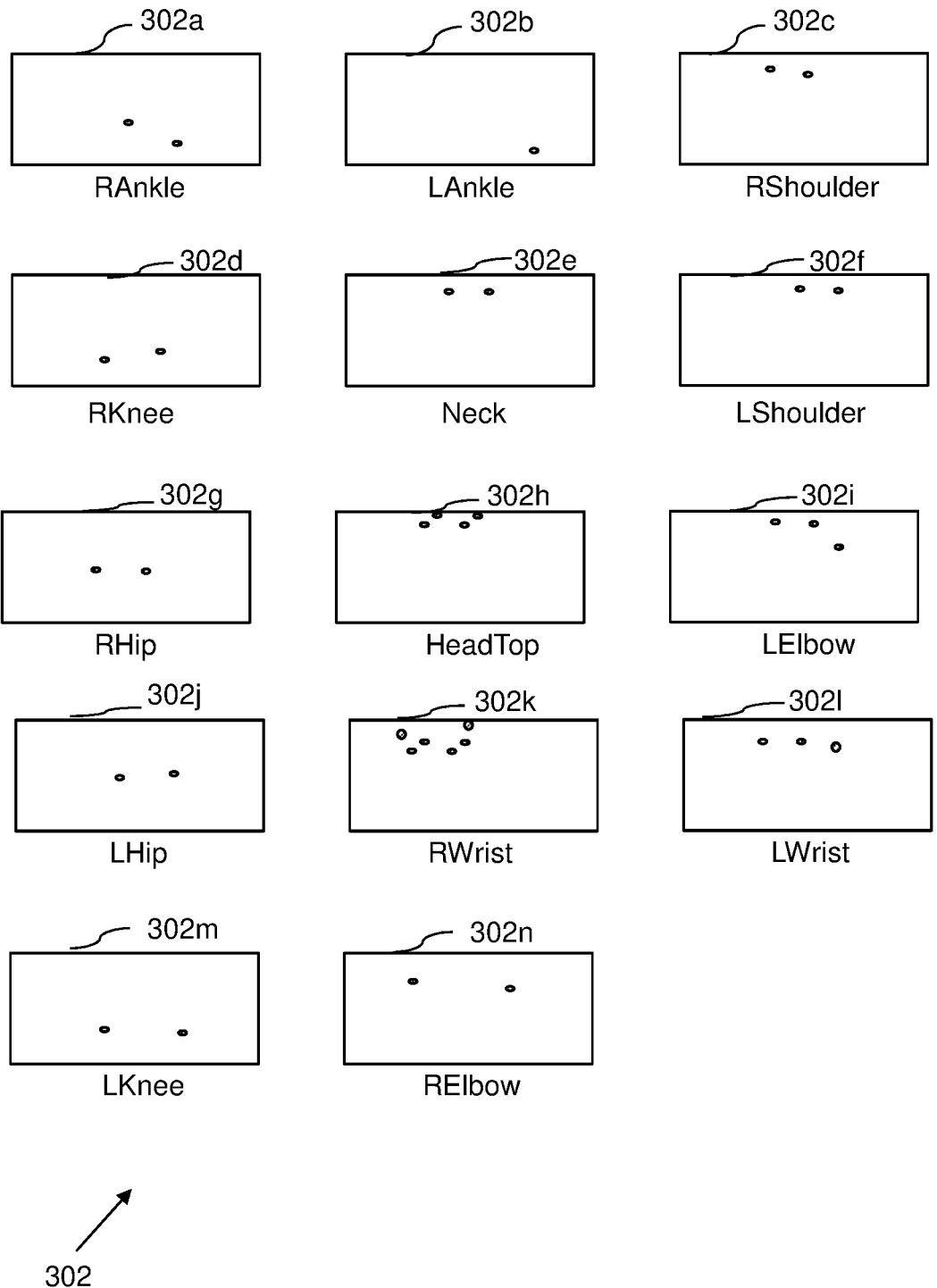
FIG. 3 is an illustration of a plurality of part confidence map created to detect an articulate body pose, in accordance with an exemplary embodiment of the present disclosure.

FIG. 3 is an illustration of exemplary first through fourteen part confidence maps (PCMs) 302a to 302h (hereinafter collectively referred to a PCMs 302) generated for the imagery content 200. Each PCM 302 refers to a graphical representation of a location of a two-dimensional anatomical key point for each joint of the articulate body poses of the imagery content 200. The articulate body is segmented from the background to compute each PCM 302, and each joint of the articulate body is identified to create a corresponding PCM 302. In an example, when the imagery content 200 includes two players playing football, each joint of each of the players such as a knee, an elbow, a shoulder, a wrist and so forth are identified and the PCM may be created for each joint. Once, the PCMs 302 are generated, a heatmap may be created by projecting the PCMs 302 on the top-down view of corresponding imagery content 200. In the heatmap, the detected joints in the PCMs 302 may be superimposed on a region of the respective joints of the articulate body. The region may include an exact location of the respective joints.

The second part of the GT label includes Part Affinity Fields (PAFs), where each PAF define a joint connection of the articulate body pose of the imagery content 200. Examples of the joint connection include, but are not limited to, a head-neck connection, a right elbow-right shoulder connection, and a right elbow-right shoulder connection. For each joint connection, the GT generation module 104 is configured to generate two label matrices, one label matrix for the X direction, and another label matrix for the Y direction. In an example, each label matrix is a (46×46) label matrix.

For generating the label matrices, the GT generation module 104 takes two joint positions, for example, joint positions of head and neck, and draw a line between the two joint positions to generate a joint connection. Thereafter, the GT generation module 104 calculates a set of points in each of the X and Y directions, that correspond to the joint connection. The set of point include one or more points that are within a distance threshold of the line segment between the two joints.

Figure 4A:
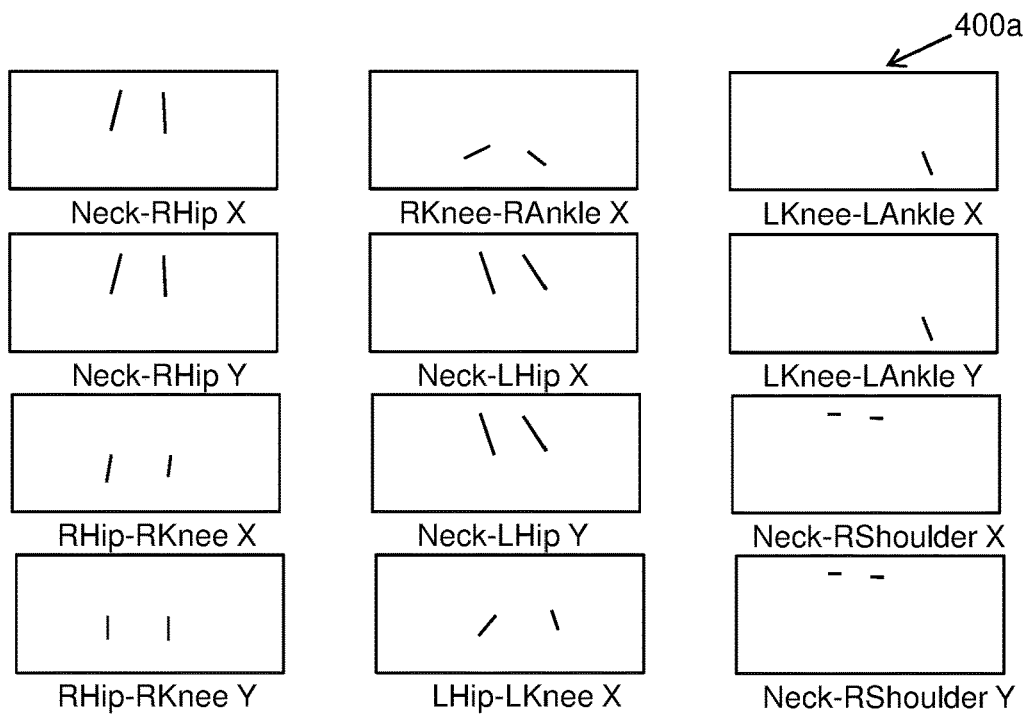
FIGS. 4A and 4B are illustrations of plurality of part affinity map created to detect an articulate body pose, in accordance with an exemplary embodiment of the present disclosure.
Figure 4B:
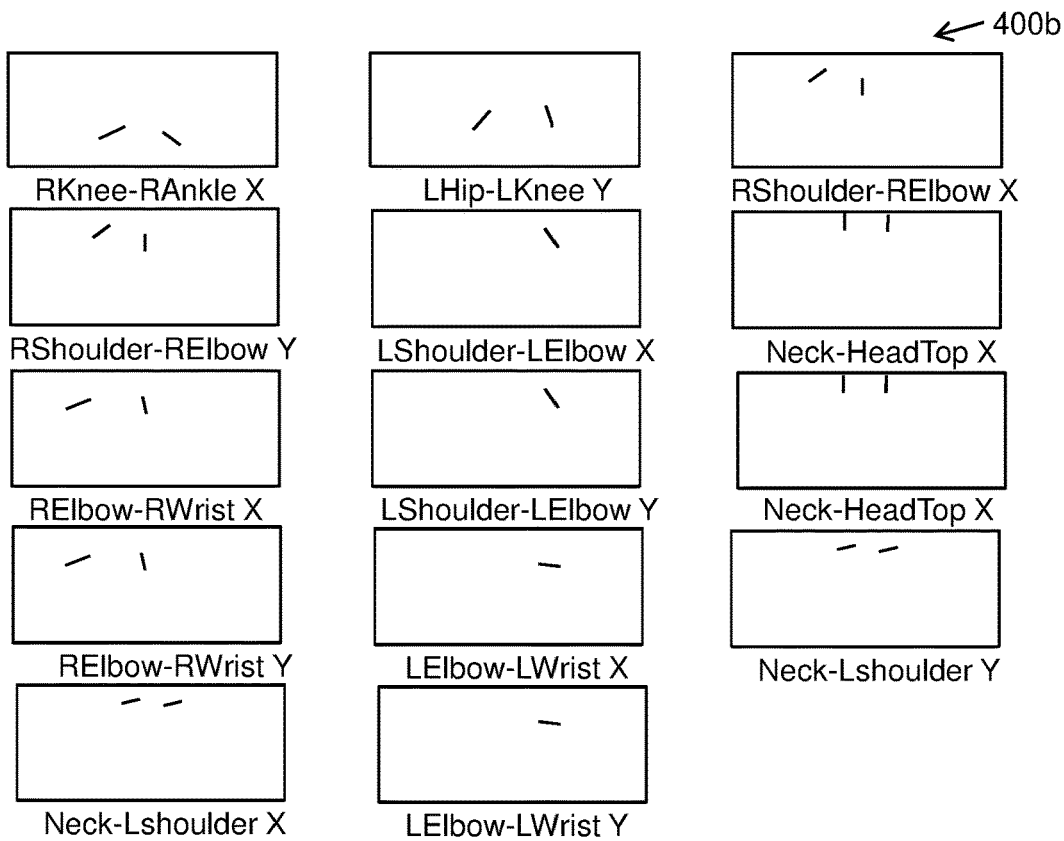

FIGS. 4A and 4B are illustration of exemplary PAFs 400a and 400b generated for the imagery content 200, in accordance with an exemplary embodiment of the present disclosure. The PAF as used herein refers to a two-dimensional vector field associated with each joint connection of the articulate body. In an example, in a human body, an elbow and a wrist are connected through a forearm. Thus, the PAF corresponds to a forearm created to detect the articulate body pose. In order to create a PAF for a joint connection (such as elbow-wrist, knee-ankle and so forth), two matrices may be generated corresponding to x and y axes. Thereafter, a line between the joint connection is calculated, wherein the line may correspond to a region (such as forearm) linking the joint connection.

Once, the PAFs 400a and 400b are generated for an imagery content, a vector map may be generated by projecting the PAFs 400a and 400b on the top-down view of the imagery content 200. Therefore, the detected joint connections in each of the PAFs 400a and 400b is superimposed at an exact location of the respective joint connection of the articulate body.

For the imagery content 200, corresponding PCMs and PAFs are combined to form an image associated label. The label is the ground truth for the imagery content 200.

In an embodiment of the present disclosure, the GT generation module 104 is configured to generate the ground truth for the pose estimation neural network 106 using a plurality of datasets including image content similar to the imagery content 200. For multiple types of data sets, the GT generation module 104 may be configured to define a common skeleton structure. Further, the datasets are validated beforehand in order to build the best ground truth possible. Furthermore, the image content of the datasets may be pre-processed for adjusting contrast and brightness. Also, the image content of the datasets may be multiplied by applying augmentations such as rotations, translations, scaling and zooming.

Referring back to FIG. 1, the system 100 further includes a pose estimation neural network 106 that is a convolutional neural network for processing the top-down views of an imagery content. The term "neural network" as used herein can include a highly interconnected network of processing elements, each optionally associated with a local memory. In an example, the neural network may be Kohonen map, multi-layer perceptron and so forth. Furthermore, the processing elements of the neural networks can be "artificial neural units", "artificial neurons," "neural units," "neurons," "nodes," and the like. Moreover, the neuron can receive data from an input or one or more other neurons, process the data, and send processed data to an output or yet one or more other neurons. The neural network or one or more neurons thereof can be generated in either hardware, software, or a combination of hardware and software, and the neural network can be subsequently trained. It will be appreciated that the convolutional neural network consists of an input layer, a plurality of hidden layers and an output layer. Moreover, the plurality of hidden layers of the convolutional neural network typically consist of convolutional layers, pooling layers, fully connected layers and normalization layers. Optionally, a Visual Geometry Group 19 (VGG 19) model is used as a convolutional neural network architecture. The VGG 19 model is configured to classify objects in the imagery data fed thereto. In an example, an image comprising a car, a human sitting in a lawn with and a dog is fed to the VGG 19 convolutional neural network. The VGG 19 identifies and classifies the car, the human and the dog from the image fed thereto. Similarly, the VGG 19 model is trained to identify articulate body in the imagery content for the detection of the articulate body pose. Notably, multiple articulate bodies may be identified and the poses associated with each of the articulate body may be detected. The VGG 19 model is configured to receive the imagery content through the input layers thereof. Furthermore, the imagery content is passed onto the hidden layers for further processing thereof. It will be appreciated that the hidden layers comprise a plurality of sets of convolution layers.

The pose estimation neural network 106 is configured to generate prediction labels 108 for the imagery content 200 based on the imagery content 200, and GT data of the imagery content 200. For the imagery content 200, the prediction labels 108 includes PCMs at multiple sigma values, and PAFs at multiple threshold values.

In an embodiment of the present disclosure, the pose estimation neural network 106 is configured to create the PCM for the imagery content 200 for a plurality of sigma values. The PCM for each joint (such as a left shoulder, a right elbow, head and so forth) is created by generating a matrix. Moreover, in order to generate the matrix, an x-y location for each joint is taken. Furthermore, a normal distribution (such as a Gauss distribution) is applied around the joint. Moreover, a value 'sigma' is assigned to the PCM depending upon the amount of the normal distribution around the joint. Notably, the larger the normal distribution around the joint, the greater the value of sigma.

In another embodiment of the present disclosure, the pose estimation neural network 106 is configured to create PAFs for a plurality of threshold values. The PAF for each joint connection is created by generating two matrices. Moreover, in order to generate the two matrices, one matrix for the X direction, and the other matrix for the Y direction, two scaled joint connections (such as a head-neck) are considered. Furthermore, the line between the joint connections is calculated and a set of points that correspond to the joint connection are calculated. Moreover, a 'threshold' value is assigned to the PAF depending upon a distance of each of the set of points from the line (i.e. the line connecting the two joints) in the PAF.

The system 100 further includes a joint extraction module 110 that is configured to extract a plurality of joint positions (x,y) for each joint of the imagery content 200, from the prediction labels 108. The plurality of joint positions corresponds to the plurality of sigma and threshold values of PCM and PAF respectively.

The system further includes a skeleton structure building module 112 that is configured to build a plurality of skeleton structures (hereinafter also referred to as inferred skeletons) based on corresponding plurality of joint positions of the imagery content 200. The plurality of skeleton structures corresponds to the plurality of sigma and threshold values of PCM and PAF respectively.

Figure 5:
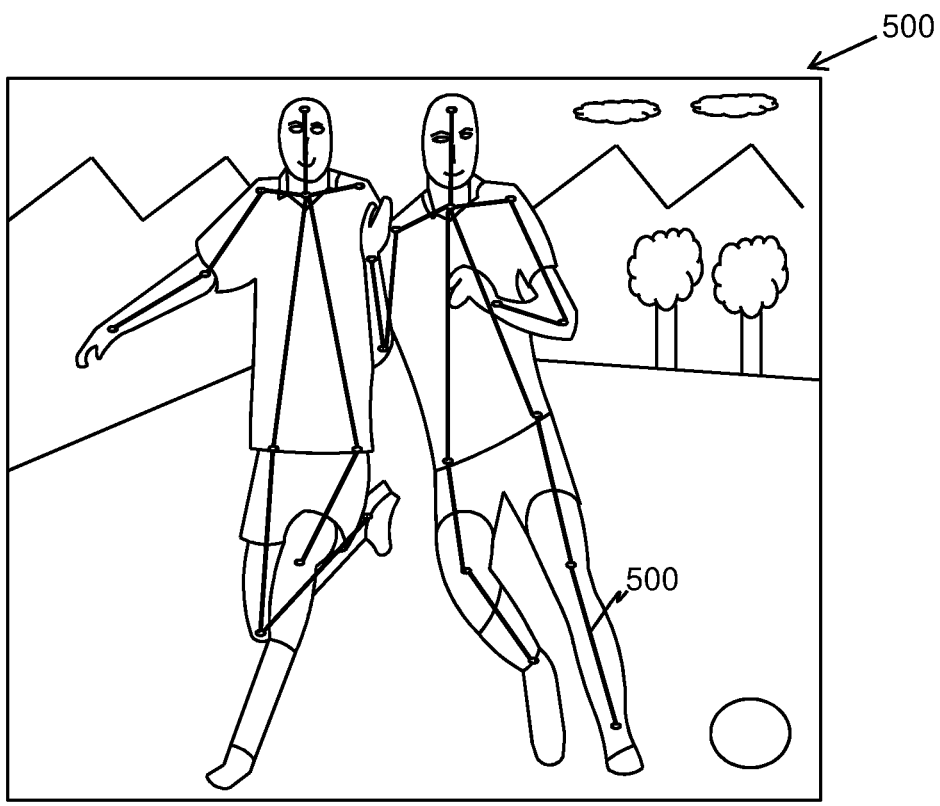
FIG. 5 is an illustration of a body-framework corresponding to the articulate body pose in the imagery content of FIG. 2, in accordance with an exemplary embodiment of the present disclosure.

Referring to FIG. 5, there is shown an illustration of a body-framework 500 generated by the skeleton structure building module 112 for the imagery content 200, in accordance with an exemplary embodiment of the present disclosure. The body-framework 500 corresponds to a skeleton structure build from detected joints and detected joint connections. The detected articulate body poses may be displayed as the body-framework 500 superimposed on the articulate bodies.

Referring back to FIG. 1, the system 100 may further include a display device 114 for enabling the viewer to view the detected articulate body pose in real-time. Examples of the display device 114 include, but are not limited to, Liquid Crystal Displays (LCD) devices, Light Emitting Diode (LED)-based displays, Organic LED (OLED)-based displays devices, and micro OLED-based display devices.

In an embodiment of the present disclosure, the skeleton structures generated by the skeleton structure building module 112 are further used by a training module 116 for the training of the pose estimation neural network 106. The training module 116 compares the inferred skeletons with the GT skeletons, and determines a number of matched joint points, and a number of matched skeletons. It will be appreciated that the training process of the pose estimation neural network 106 is performed until it is able to generate the skeleton structure(s) for the imagery content 200 accurately for a predefined number of times.

In an embodiment of the present disclosure, for the imagery content 200, the training module 116 is configured to compare the defined PCM (i.e. the PCM of the ground truth) with each of the plurality of prediction PCMs generated by the pose estimation neural network 106. Moreover, the prediction PCM that matches the best with the ground truth PCM is selected. Furthermore, the sigma value (i.e. the true sigma value) corresponding to the selected PCM part confidence map is assigned to the imagery content 200. In another embodiment of the present disclosure, for the imagery content 200, the system 100 is operable to compare the defined PAF (i.e. the PAF of the GT), with each of the predicted PAFs to select a true threshold value from the plurality of threshold values. Moreover, the part affinity field that matches the best with the ground truth is selected. Furthermore, the threshold value corresponding to the selected part affinity field (i.e. the true threshold value) is assigned to the imagery content 200.

In an example, the heatmaps outputted by the joint extraction module 110 are compared with ground truth heatmaps, by comparing points (the center of each circle on heatmaps) and matching them. The two points are considered to match if they are in the same location or if there it is a difference of at most one pixel on x-axis or on y-axis, but not on both. Then, the output of the inference, namely the skeletons generated by the skeleton structure building module 112 are compared to the ground truth skeletons. Two skeletons are matched by maximizing the number of points matched between them and minimizing the distance between remaining points. The points are matched as specified above. Based on this comparison, metrics such as the number of matched skeletons and remaining number of skeletons (unmatched) are determined.

Figure 6:
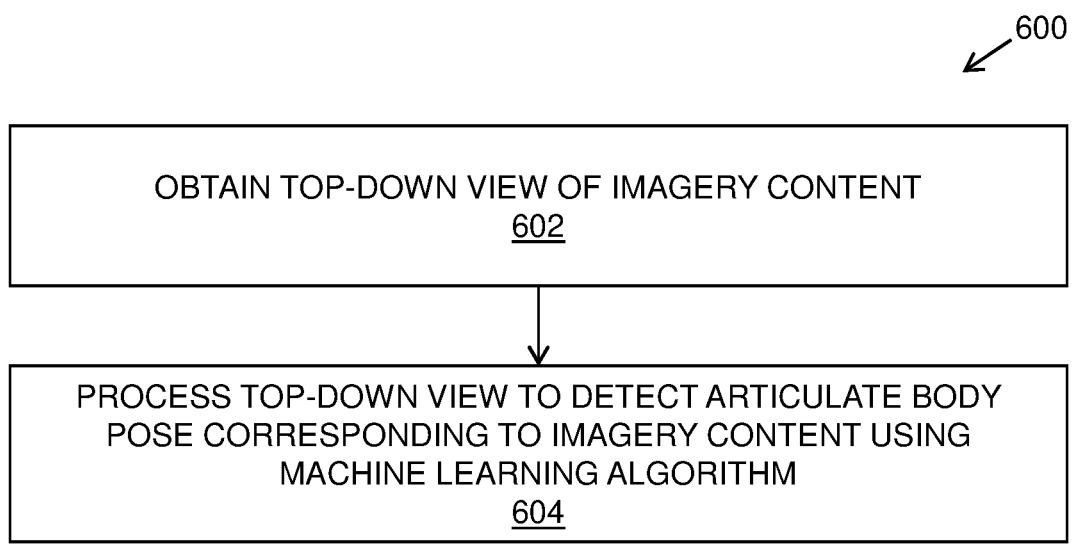
FIG. 6 illustrates steps of a method for detecting an articulate body pose from an imagery content, in accordance with an embodiment of the present disclosure.

Referring to FIG. 6, there is illustrated steps of the method for detecting the articulate body pose from the imagery content, in accordance with an embodiment of the present disclosure. At a step 602, a top-down view of the imagery content is obtained. At a step 604, the top-down view is processed to detect the articulate body pose corresponding to the imagery content using a machine learning algorithm. The step 604 further comprises creating the part confidence map corresponding to each joint of the articulate body pose, generating the heatmap by projecting the part confidence map on the top-down view of the imagery content, creating the part affinity field corresponding to each body part associated with the each joint of the articulate body pose, generating the vector map by projecting the part affinity field on the top-down view of the imagery content and generating a body-framework corresponding to the articulate body pose, using the heatmap and the vector map, to detect the articulate body pose.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system to detect an articulate body pose that includes a plurality of joints from an imagery content, the system comprising:
   an imaging device disposed at a height to focus on a vertical line of sight for capturing a top-down view of the imagery content; and a processor communicatively coupled to the imaging device and a memory communicatively coupled to the imaging device and the processor, wherein the processor is operable to:
  obtain the top down view of the imagery content from the imaging device; and
  process the top-down view of the imagery content co-operatively with a machine learning algorithm, trained in tandem with the process, by:
    creating a part confidence map, for a plurality of sigma values, corresponding to each joint of the articulate body pose;
    creating a part affinity map, for a plurality of threshold values, corresponding to each body part associated with the each joint of the articulate body pose;
    receiving a defined part confidence map and a defined part affinity map from the memory;
    comparing the part confidence map for the plurality of sigma values with the defined part confidence map to select a true sigma value from the plurality of sigma values;
    comparing the part affinity map for the plurality of threshold values with the defined part affinity map to select a true threshold value from the plurality of threshold values;
    generating a heatmap by projecting the part confidence map of the true sigma value on the top-down view of the imagery content;
    generating a vector map by projecting the part affinity map of the true threshold value on the top-down view of the imagery content; and
    generating a body-framework comprising skeleton structures corresponding to the articulate body pose, using the heatmap and the vector map, to detect the articulate body pose.

2. The system of claim 1, wherein the imaging device forms part of an imaging module comprising a processor and a memory.

3. The system of claim 1, wherein the imagery content comprises at least one of: image, video and graphics interchange format (GIF) based content.

4. The system of claim 1, wherein the training of the machine learning algorithm includes:
  generating ground truth skeletons using a plurality of datasets including image content similar to the imagery content;
  comparing inferred skeletons of the body-framework with the ground truth skeletons; and
  determining a number of matched joint points and a number of matched skeletons based on the comparison of the inferred skeletons with the ground truth skeletons.

5. The system of claim 1, wherein the system comprises lowering a resolution of the top-down view of the imagery content prior to processing thereof.

6. The system of claim 1, wherein obtaining the top-down view comprise one of:
  receiving the imagery content in the form of the top-down view; or
  processing a plurality of views of the imagery content to obtain the top-down view therefrom.

7. The system of claim 6, wherein the plurality of views of the imagery content comprises: rear view, front view, top view, bottom view, left-hand side view, right-hand side view, and perspective view.

8. The system of claim 1, wherein the system further comprises a display device for viewing the detected articulate body pose.

9. A method for detecting an articulate body pose that includes a plurality of joints from imagery content, the method comprising:
  capturing a top-down view of the imagery content using an imaging device, the imaging device disposed at a height to focus on a vertical line of sight when capturing the top-down view of the imagery content;
  obtaining the top-down view of the imagery content; and
  processing the top-down view of the imagery content co-operatively with a machine learning algorithm, trained in tandem with the process, by:
    creating a part confidence map, for a plurality of sigma values, corresponding to each joint of the articulate body pose;
    creating a part affinity map, for a plurality of threshold values, corresponding to each body part associated with the each joint of the articulate body pose;
    receiving a defined part confidence map and a defined part affinity map from a memory communicatively coupled with the imaging device;
    comparing the part confidence map for the plurality of sigma values with the defined part confidence map to select a true sigma value from the plurality of sigma values;
    comparing the part affinity map for the plurality of threshold values with the defined part affinity map to select a true threshold value from the plurality of threshold values;
    generating a heatmap by projecting the part confidence map of the true sigma value on the top-down view of the imagery content;
    generating a vector map of the true threshold value by projecting the part affinity map on the top-down view of the imagery content; and
    generating a body-framework comprising skeleton structures corresponding to the articulate body pose, using the heatmap and the vector map, to detect the articulate body pose.

10. The method of claim 9, wherein the method comprises employing a convolutional neural network to create the part confidence map and the part affinity map.

11. The method of claim 9, wherein the method further comprises training of the machine learning algorithm by:
  generating ground truth skeletons using a plurality of datasets including image content similar to the imagery content;
  comparing inferred skeletons of the body-framework with the ground truth skeletons; and
  determining a number of matched joint points and a number of matched skeletons based on the comparison of the inferred skeletons with the ground truth skeletons.

12. The method of claim 9, wherein the method comprises lowering a resolution of the top-down view of the imagery content prior to processing thereof.

13. The method of claim 9, wherein obtaining the top-down view comprise one of:
  receiving the imagery content in the form of the top-down view; or
  processing a plurality of views of the imagery content to obtain the top-down view therefrom.

14. The method of claim 13, wherein the plurality of views of the imagery content comprises: rear view, front view, top view, bottom view, left-hand side view, right-hand side view, and perspective view.

15. A processing circuit for detecting an articulate body pose that includes a plurality of joints from an imagery content, the processing circuit configured to:
   capture a top-down view of the imagery content using an imaging device, the imaging device disposed at a height to focus on a vertical line of sight when capturing the top-down view of the imagery content;
   obtain the top-down view of the imagery content; and
   process the top-down view of the imagery content co-operatively with a machine learning algorithm, trained in tandem with the process, by:
      creating a part confidence map, for a plurality of sigma values, corresponding to each joint of the articulate body pose;
      creating a part affinity map, for a plurality of threshold values, corresponding to each body part associated with the each joint of the articulate body pose;
      receiving a defined part confidence map and a defined part affinity map from a memory communicatively coupled with the imaging device;
      comparing the part confidence map for the plurality of sigma values with the defined part confidence map to select a true sigma value from the plurality of sigma values;
      comparing the part affinity map for the plurality of threshold values with the defined part affinity map to select a true threshold value from the plurality of threshold values;
      generating a heatmap by projecting the part confidence map of the true sigma value on the top-down view of the imagery content;
      generating a vector map of the true threshold value by projecting the part affinity map on the top-down view of the imagery content; and
      generating a body-framework comprising skeleton structures corresponding to the articulate body pose, using the heatmap and the vector map, to detect the articulate body pose.

16. The processing circuit of claim 15, wherein a convolutional neural network is employed to create the part confidence map and the part affinity map.

17. The processing circuit of claim 15, further configured to:
   generate ground truth skeletons using a plurality of datasets including image content similar to the imagery content;
   compare inferred skeletons of the body-framework with the ground truth skeletons; and
   determine a number of matched joint points and a number of matched skeletons based on the comparison of the inferred skeletons with the ground truth skeletons.

18. The processing circuit of claim 15, further configured to:
   receive the imagery content in the form of the top-down view; or
   process a plurality of views of the imagery content to obtain the top-down view therefrom.

19. The processing circuit of claim 18, wherein the plurality of views of the imagery content comprises: rear view, front view, top view, bottom view, left-hand side view, right-hand side view, and perspective view.

* * * * *